Jan. 20, 1953   N. W. LEWIS   2,625,841
POWER TRANSMISSION SYSTEM
Filed Dec. 2, 1949   2 SHEETS—SHEET 1
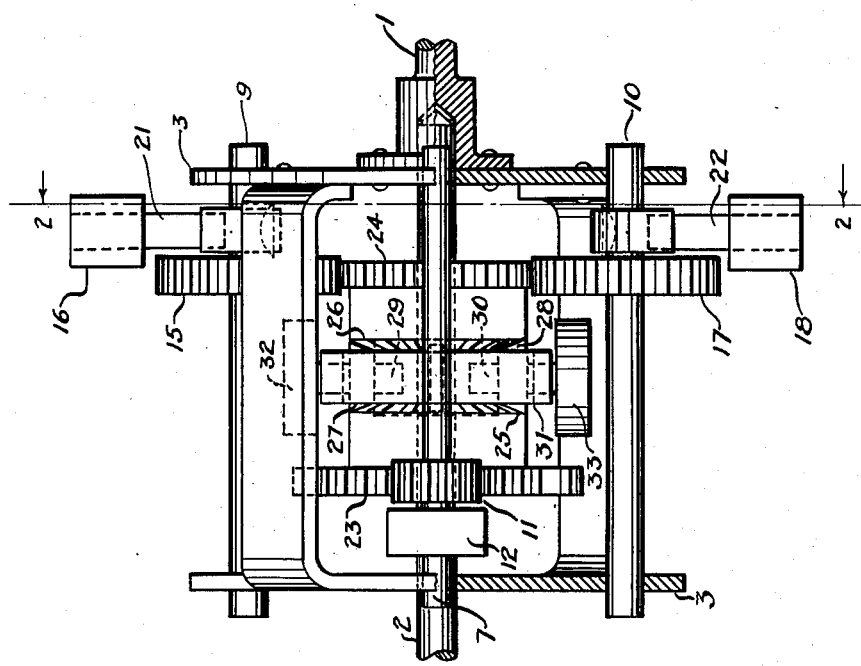
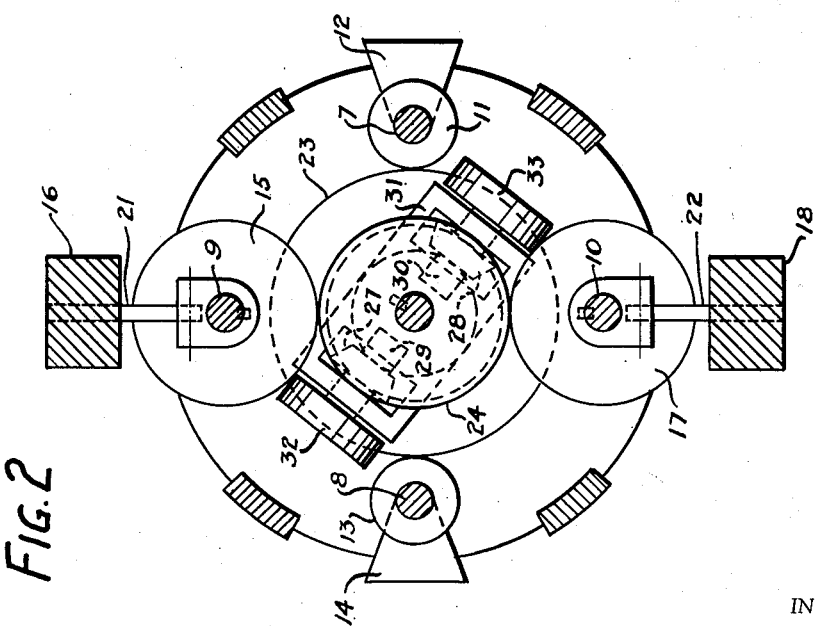
INVENTOR
Neilson W. Lewis
BY Raymond J. Norton
ATTORNEY Jan. 20, 1953  N. W. LEWIS  2,625,841
POWER TRANSMISSION SYSTEM
Filed Dec. 2, 1949  2 SHEETS—SHEET 2
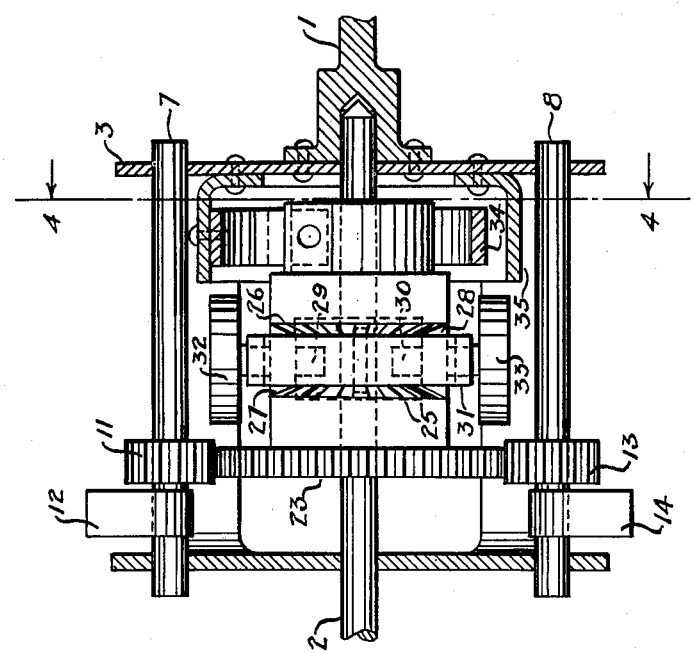
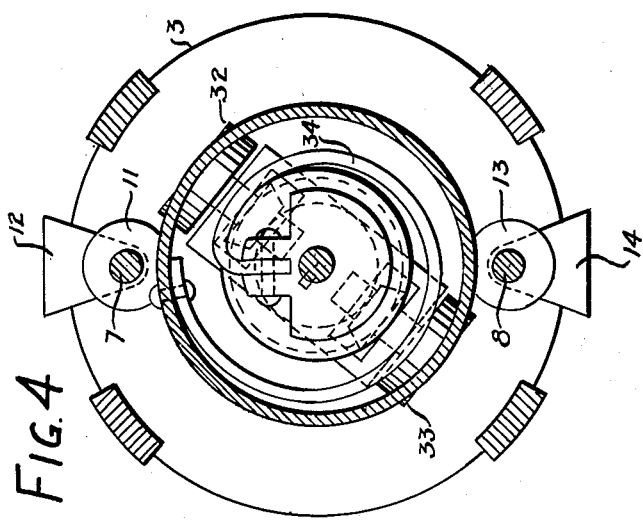
INVENTOR
Neilson W. Lewis
BY Raymond J. Norton
ATTORNEY Patented Jan. 20, 1953

2,625,841

UNITED STATES PATENT OFFICE 2,625,841

POWER TRANSMISSION SYSTEM

Neilson W. Lewis, Washington, D. C., assignor of forty per cent to Archibald McLachlen, Washington, D. C.

Application December 2, 1949, Serial No. 130,748

4 Claims. (Cl. 74—752)

This invention relates to a power transmission system, specifically, to an automatic transmission with an infinitely varying ratio between the speed and torque of the input shaft to the speed and torque of the output shaft.

This invention is similar to and is an improvement on the apparatus described in prior Patent No. 2,476,245. Like the prior patent, this novel transmission has the characteristic of the driven shaft being perfectly adaptable to the torque requirements of the load. This feature is desirable when transmissions are used in a power system which acts against a load of varying magnitude as in power vehicles. As will be seen, the speed of the driven shaft is governed, in an inverse ratio, with the magnitude of the load requirement, and varies directly with the power input to the transmission.

Considered broadly, the present invention utilizes the alternating accelerations from two sets of planetarily mounted eccentric weights, upon a flywheel which is interposed between the two sets of weights; the inertia forces on the flywheel from these accelerations coacting with impulses caused by centrifugal force on the two sets of weights, to produce a smooth output force. To reduce overall size of the transmission, one set of weights may be replaced by a spring.

To illustrate this action, preferred physical embodiments are shown in the accompanying drawings in which:

Fig. 1 is a half cross-section of a side elevation of a transmission unit with two sets of eccentric weights; and Fig. 2 is a vertical cross-section taken on line 2—2 in Fig. 1.

Fig. 3 is a vertical cross-section of a side elevation of a transmission unit with one set of weights and a spring; and Fig. 4 is a vertical cross section taken on line 4—4 of Fig. 3.

The present invention, as previously noted, comprises the provision of an automatically changing, variable torque transmission in which two sets of eccentric weights of different mass are mounted on the planetary gears of two epicyclic gear systems which are interconnected through a differential gear on which a flywheel is mounted. Inertia forces from cyclically intermittent accelerations of the flywheel and components of the centrifugal forces on the two weights combine at the housing of the differential gear to provide a uniform and infinitely varying ratio of output torque to input torque.

This mode of operation will be readily understood from a consideration of the mechanism shown in the accompanying drawings.

The variable transmission unit is interposed between driving shaft 1 and driven shaft 2. The driving shaft is connected to a power source and the driven shaft is connected to the unit on which the driving torque is to be exerted.

In the embodiment shown in Fig. 1 and Fig. 2, the transmission mechanism includes the case 3 of two epicyclic gear systems, which case is rigidly attached to drive shaft 1.

The case 3 carries the pairs of diametrically positioned shafts 7 and 8, and 9 and 10. To shaft 7 is rigidly attached gear 11 and eccentrically positioned weight 12. Similarly, eccentric weight 14 and gear 13 are rigidly attached to shaft 8. Weights 12 and 14 are equal and are mounted at an equal distance from their shaft axes.

Shafts 9 and 10 are similarly provided with planetary gears and with eccentric weights which are attached in a resilient manner. The shaft 9 has rigidly attached thereto the gear 15 and resiliently attached by means of spring 21, the eccentric weight 16. Similarly, on shaft 10 is rigidly mounted gear 17, and is resiliently mounted by spring 22, eccentric weight 18. Weights 16 and 18 are equal and are positioned at an equal distance from their respective axes. Spring 21 has a degree of resilience equal to that of spring 22.

Planetary gears 11 and 13 mesh with the central gear 23 which is mounted as an idler gear upon the driven shaft 2. Crown gear 25 is affixed to gear 23. Similarly, gears 15 and 17 mesh with central gear 24, also freely mounted upon shaft 2 and crown gear 26 is attached to gear 24. Crown gears 25 and 26 are positioned on opposite sides of, and mesh with the bevel gears 27 and 28 which are rigidly mounted on shafts 29 and 30, freely mounted in the central spider 31, which, in turn, is mounted on, and is securely affixed to the driven shaft 2. On shafts 29 and 30 are rigidly mounted flywheels 32 and 33. These flywheels have relatively large moments of inertia and make an important contribution to the final torque output.

It is to be noted that the eccentric weights 16 and 18 have a larger moment about their respective axes than weights 12 and 14, and also to be noted that the ratio of the radii of gears 15 and 17 to radius of gear 24 differs from the ratio of the radii of gears 11 and 13 to the radius of gear 23. As case 3 revolves and as the driven shaft 2 tends to be held stationary by the load, the pairs of planetary gears are forced to rotate in the same direction as the case. Eccentric weight pairs 12 and 14, and 16 and 18, are thus forced inward, but, as they do so, are also pulled outward by the centrifugal force from the rotation of case 3. While modified by the ratio of the gears on the two sides of the inner gear train, the larger moment arms of weight pair 16 and 18 offers more resistance to this inward motion than that of weight pair 12 and 14. Therefore, as case 3 continues to revolve, weight pair 12 and 14 make complete revolutions about the axes of shafts 7 and 8, while weight pair 16 and 18 oscillate through partial revolutions about the axes of shafts 9 and 10.

To maintain uniformity of torque output, it is desirable to limit the range of the angle of oscillation to that where $\theta$ very nearly equals sine $\theta$ or from 0° to 10°. For that reason, the radius ratio of gears 15 and 17 to gear 24 is approximately four times the radius ratio of gears 11 and 13 to gear 23. In order to insure oscillation of the large weights 16 and 18, their effective total moment arm, modified by this factor of four and applied at the bevel gears 27 and 28, must be approximately twice the effective total moment arm of the small weights 12 and 14 applied on the opposite side of the bevel gears. The moment arms of weights 16 and 18 about their own axes are thus approximately eight times that of weights 12 and 14.

As case 3 moves past the stationary or more slowly moving spider 31, the large weights, relatively stationary with respect to the case, cause the small weights and the flywheels 32 and 33 to make complete revolutions. As the small weights move from an outermost to an innermost position, centrifugal force on them causes a deceleration of the flywheel rotation and in so doing, exerts positive pressure through the housings of shafts 29 and 30 onto the spider 31 and the driven shaft 2. At approximately the innermost position of the small weights, pressure from the case to the spider is relieved as applied by crown gear 25 on bevel gears 27 and 28 and the dominating positive pressure path, from case to spider, is from the large weights. The centrifugal force on the large weights now causes an acceleration of the flywheel rotation and exerts a consequent positive impulse upon the spider 31 and the driven shaft 2. Backlash of crown gear 25 on the bevel gears from the negative impulse from the small weights, as they pass from the innermost to outermost positions is absorbed by providing shafts 7 and 8 with suitable moments of inertia.

It should be noted that, as the case slips past the spider, there exists a tendency for this movement to occur with the least possible disturbance, that is, that this slippage will build up the least total displacement of the weights on both sides of the central differential gear at any time. Because of this trend, which maintains and is maintained by, in a reciprocal and interacting manner, the pendulum-like oscillation of the large weights and gears 15, 17, 24 and 26, and the cyclical acceleration and deceleration of the small weights and gears 11, 13, 23, 25, 27 and 28, the large weights are at an outermost position or at a position of minimum positive impulse when the small weights are at a position of maximum positive impulse or 90° from an outermost position. Similarly, the large weights are at an innermost position or a position of maximum positive impulse when the small weights are at a position of maximum negative impulse or 270° from an outermost position. This aperiodic correlation gives a dove-tailing effect on the combination, at the spider, of the cyclical impulse from the weights on both sides of the differential gear.

Components of the centrifugal forces on the large and on the small weights travel through the gears on each side of the gear train, each reacting against the inertia elements in its respective path, and, meeting at the differential gears 27 and 28, combine with the inertia reaction of the flywheels 32 and 33 to exert on the spider and on the driven shaft a continuous torque equalling and meeting the requirement of the load. To increase smoothness of output torque, large weights 16 and 18 are resiliently connected to shafts 9 and 10. As demonstrated by an experimental model, the output torque was approximately 98% constant.

The principle of utilizing the inertia reactions from a cyclically accelerating and decelerating inertia element combined with motivating periodic impulses from two mutually reacting elements may be embodied in other specific forms. The small weights and the large weights may both be replaced by springs, or, either one of the two, only, may be replaced by a spring or a set of springs. The set of springs replacing the small weights would be attached to the case and may be actuated by cranks, cams, or similar devices attached to the planetary gears 11 and 13. The large weights, planetary gears 15 and 17, and their shafts 9 and 10, may all be replaced by a single coil spring, one end being attached to the case and the other being attached to the crown gear 26.

Figs. 3 and 4 illustrate this type of embodiment which is advantageous in applications where light weight and compactness are at a premium. Spring 34 is rigidly attached to crown gear 26 and to the case 3 by means of spring housing 35.

The action of this unit is essentially the same as in the previously described embodiment, the spring expanding and contracting in a cyclical movement, interacting with sine-like periodic impulses from the rotating weights 12 and 14 to cause periodic accelerations and decelerations of rotating flywheels 32 and 33 and combining at the spider 31 with the impulses from weights 12 and 14, and with the inertia reactions from the accelerations and decelerations of flywheels 32 and 33 to produce a smooth, continuous output torque, conditioned to the requirement of the load, on the driven shaft 2.

While preferred embodiments of the invention have been shown and described, it is to be understood that these are given to illustrate the underlying principles involved and not as limiting the useful scope of the invention except as such limitations are clearly imposed by the appended claims.

I claim:

1. An automatic variable transmission comprising a drive shaft, a driven shaft, a housing in driving connection with the driven shaft, two pairs of symmetrically positioned differentially weighted planet gears carried by the housing the gears of one pair being of equal weight and diametrically positioned, and the gears of the other pair being of equal weight but greater than the weight of the gears of the first said pair, and weighted by a mass connected to such gears through a resilient connection, an epicyclic gear train including idling gears in driving connection with the driven shaft, the said planet gears being in mesh with the idling gears of said train, the lighter weighted planet gears acting through complete revolutions on the gear train and the heavier weighted planet gear acting through a resilient oscillating movement on the said train and adapted to interact to automatically deliver a smooth torque to the driven shaft.

2. An apparatus in accordance with claim 1 in which the epicyclic gear train includes applied inertia masses.

3. An apparatus in accordance with claim 1 in which the radius of the lighter weighted gears is approximately one-fourth the radius of the heavier weighted gears.

4. An apparatus in accordance with claim 1 in which the more heavily weighted gears are weighted by means of an eccentric mass connected to the gear through a spring.

NEILSON W. LEWIS.

REFERENCES CITED

The following references are of record in the file of this patent:

UNITED STATES PATENTS

| Number | Name | Date |
| --- | --- | --- |
| 1,461,559 | Reece et al. | July 10, 1923 |
| 1,525,070 | Coleman | Feb. 3, 1925 |
| 1,741,860 | Lyman et al. | Dec. 31, 1929 |
| 1,741,861 | Lyman et al. | Dec. 31, 1929 |
| 2,476,245 | Lewis | July 12, 1949 |